Figure 1:
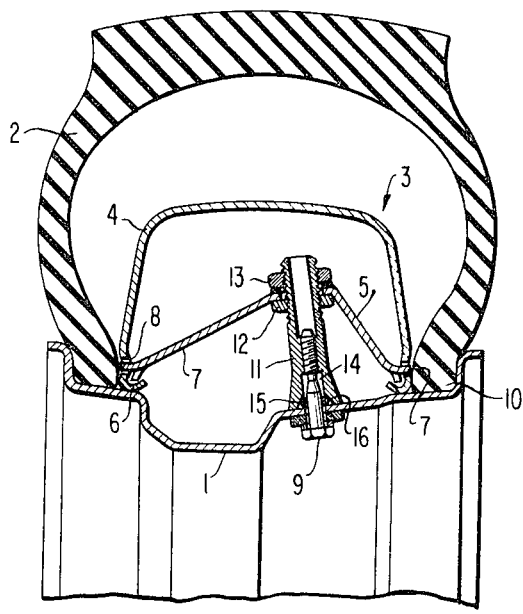

United States Patent
Rossler et al.

[15] 3,638,701
[45] Feb. 1, 1972

[54] EMERGENCY RUNNING RING FOR TUBELESS VEHICLE TIRES

[72] Inventors: Heinrich Georgi F. Rossler, Baden-Baden; Heinrich Baumann; Falk Zeidler, both of Gaggenau, all of Germany

[73] Assignee: Daimler-Benz Aktiengesellschaft, Stuttgart-Unterturkheim, Germany

[22] Filed: Feb. 18, 1970

[21] Appl. No.: 12,326

[30] Foreign Application Priority Data

Feb. 19, 1969 Germany..................P 19 08 204.3

[52] U.S. Cl............................................152/158, 152/400
[51] Int. Cl..................................................B60c 17/04
[58] Field of Search................152/158, 400, 401, 363, 365

[56] References Cited

UNITED STATES PATENTS

| | | | |
|---|---|---|---|
| 3,451,457 | 6/1969 | Leyer | 152/158 |
| 467,083 | 1/1892 | Colthar | 152/400 |
| 3,250,310 | 5/1966 | Johnson | 152/158 |

*Primary Examiner*—Arthur L. La Point
*Assistant Examiner*—George H. Libman
*Attorney*—Craig, Antonelli & Hill

[57] ABSTRACT

An emergency running ring for tubeless vehicle tires in which several hollow ring segments abutting against one another with the end faces and having a cross section matched to the tube shape, are provided with expanding inserts arranged on the inside of the hollow ring segments; the expanding inserts are supported at the hollow ring segments and are clamped against the rim bed by means of a clamping screw or bolt, whereby a spacer sleeve is associated with each expanding insert and the clamping bolt or screw engages in the spacer sleeve.

12 Claims, 2 Drawing Figures

INVENTORS
HEINRICH ROESSLER
HEINRICH BAUMANN
FALK ZEIDLER

BY Craig, Antonelli, Stewart & Hill
ATTORNEYS

EMERGENCY RUNNING RING FOR TUBELESS VEHICLE TIRES

The present invention relates to an emergency running ring for tubeless vehicle tires, especially for motor vehicles, which consists of several hollow ring segments abutting against one another with the end faces thereof and having a cross section matched to the tire shape, and of expanding inserts arranged inside the hollow ring segments which are supported at the hollow ring segments and which are clamped by means of clamping screws or bolts against the rim bed.

The present invention aims at an advantageous construction of such emergency running rings, and as solution to the underlying problems, the present invention consists in that a spacer sleeve supported at the rim bed is coordinated to each expanding insert and the clamping screw or bolt engages in the spacer sleeve.

It is achieved in an advantageous manner by the arrangement of a spacer sleeve and by the engagement of the threaded clamping member in the spacer sleeve that the expanding inserts can be expanded up to a predetermined amount which is given by the free length of the spacer sleeve. It is avoided that too much or too little an expanding is carried out. All expanding inserts are expanded necessarily by the same amount. Furthermore, a rigid connection is achieved between the rim, the threaded clamping members, the spacer sleeves, the expanding inserts, and the hollow ring segments.

It is further achieved, by utilizing the means for predetermining the amount of expansion, in the form of a spacer sleeve, and the threaded clamping member engaged therein, that the tire shoulders or beads are always pressed with the same amount of force against the horn or tip of the rim bed, thereby preventing displacement of the tire with respect to the rim when driving in the airless condition.

In order that the free length of the spacer sleeves can be adjusted, it is recommended in a further development and according to a further feature of the present invention to connect the spacer sleeves by a threaded connection with the expanding inserts. The spacer sleeves may be further provided at the end thereof facing the rim bed with a conically shaped aperture or recess starting from the bore of the threaded clamping member and a seal may be arranged in this recess or aperture.

In order that a secure anchoring against lateral displacement of the expanding inserts with the hollow ring segments is realized, there may be provided at the ends of the expanding inserts supported at the hollow ring segments, outwardly angularly bent brackets which engage in slots in the hollow ring segments.

In order to increase the stability, two expanding inserts may be arranged in each hollow ring segment.

The expanding insert may also be made in one piece with the associated spacer sleeve.

Accordingly, it is an object of the present invention to provide an emergency running ring for tubeless vehicle tire arrangements which avoids by simple means the aforementioned shortcomings and drawbacks encountered in the prior art.

Another object of the present invention resides in an emergency running ring for a tubeless vehicle tiring which assures an expanding action by a predetermined amount which is the same in all cases.

A further object of the present invention resides in an emergency running ring of the type described above that assures a rigid connection between the various parts, a safe anchoring against lateral displacement of the expanding inserts and a high stability of the entire installation.

Figure 2:
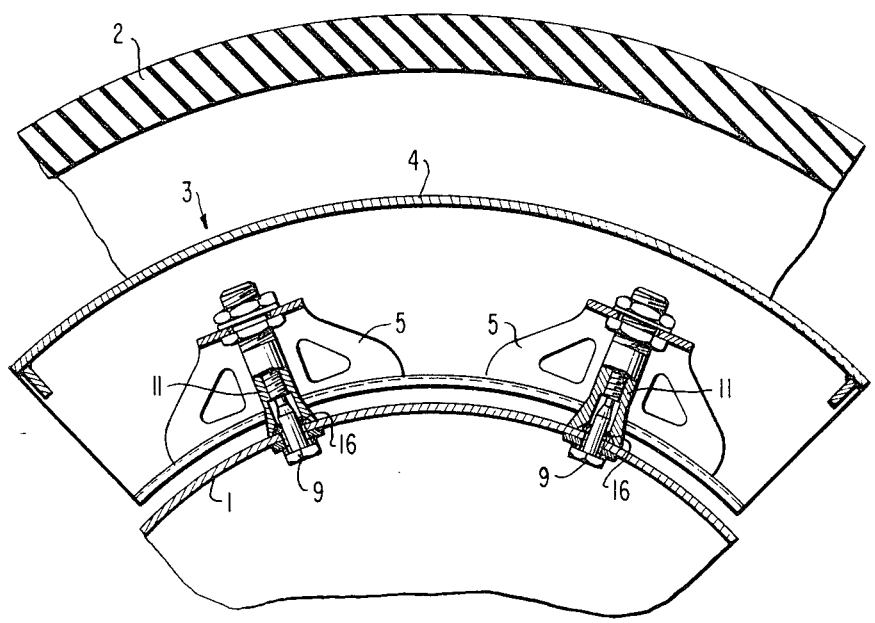

These and further objects, features, and advantages of the present invention will become more obvious from the following description when taken in connection with the accompanying drawing which shows, for purposes of illustration only, one embodiment in accordance with the present invention, and wherein:

FIG. 1 is a cross-sectional view through a vehicle wheel with an emergency running ring in accordance with the present invention; and FIG. 2 is a partial longitudinal cross-sectional view through the vehicle wheel according to FIG. 1.

Referring now to the drawing wherein like reference numerals are used throughout the two views to designate like parts, reference numeral 1 designates in both FIGURES the rim of the illustrated vehicle wheel on which is seated the tubeless tire 2. An emergency running ring generally designated by reference numeral 3 is arranged on the inside of the tire 2, which consists of several hollow ring segments 4 which have a cross section matched to the tire shape and which, with rounded-off corners, abut against one another with the end faces thereof. Furthermore, two expanding inserts 5 are arranged in each hollow ring segment 4 which are supported on both sides 6 at the hollow ring segments 4. For the purpose of securing and mounting the assembly, an angularly bent bracket 7 is provided at half length of each expanding insert 5 on both sides thereof which engages in a respective slot 8 in the hollow ring segment 4. Each expanding insert 5 is expanded by the threaded clamping element 9 such as a clamping bolt or clamping screw, inserted into the rim 1 in such a manner that the expanding insert 5 presses the hollow ring segment 4 securely against the tire shoulders 10. In order to attain a predetermined amount for the expanding of the expanding inserts 5, and in order to achieve that all expanding inserts are expanded by the same amount, the spacer sleeve 11 is arranged in each expanding insert 5. The spacer sleeve 11 is adjustably secured at the crown or crest of the expanding insert 5 by means of nuts 12 and 13. The threaded clamping member 9 engages into the free end of the spacer sleeve 11; the threaded clamping member 9 pulls the spacer sleeve 11 against the rim 1 so that the expanding insert 5 is expanded by way of the spacer sleeve 11 by an amount determined by the length of the spacer sleeve.

In order to be able to realize in a favorable manner a sealing of the passage of the threaded clamping member 9 through the rim 1, the bore 14 through the spacer sleeve 11 is provided with a conically shaped recess 15. The sealing ring 16 is arranged in the recess 15 which effectively seals the rim 1 with a tightened clamping member 9.

Insofar as a constant tire bead width exists, the spacer sleeve associated with each expanding insert may also be connected therewith nondetachably. For example, the spacer sleeve may be riveted to the expanding insert.

Possibly, the expanding insert may also be made in one piece with the spacer sleeve.

Thus, while we have shown and described only one embodiment in accordance with the present invention, it is obvious that the same is not limited thereto but is susceptible of numerous changes and modifications as known to those skilled in the art; and we therefore do not wish to be limited to the details shown and described herein but intend to cover all such changes and modifications as are encompassed by the scope of the appended claims.

We claim:

1. An emergency running ring for tubeless vehicle tires comprising several hollow ring segments abutting against one another with the end faces thereof and having a cross section matched to the tire shape, expanding insert means arranged on the inside of each of the hollow ring segments, said expanding insert means being supported at the hollow ring segments and being clamped against the rim bed by means of clamping means having a first threaded connection, an adjustable spacer sleeve associated with each expanding insert means, said sleeve being supported at the rim bed, and wherein said clamping means engages in the spacer sleeve through said first threaded connection.

2. An emergency running ring according to claim 1, characterized in that the spacer sleeve is adjustably connected with the expanding insert means by a second threaded connection.

3. An emergency running ring for tubeless vehicle tires comprising several hollow ring segments abutting against one another with the end faces thereof and having a cross section matched to the tire shape, expanding insert means arranged on the inside of each of the hollow ring segments, said expanding insert means being supported at the hollow ring segments and being clamped against the rim bed by means of clamping means having a first threaded connection, a spacer sleeve associated with each expanding insert means, said sleeve being supported at the rim bed, said clamping means engaging in the spacer sleeve through said first threaded connection, characterized in that the spacer sleeve is provided at its end facing the rim bed with a conically shaped recess starting from the bore for the first clamping means, a seal means being provided in said recess.

4. An emergency running ring according to claim 3, characterized in that outwardly angularly bent bracket means are provided at the ends of the hollow expanding insert means supported at the hollow ring segments, said bracket means engaging in slots in the hollow ring segments.

5. An emergency running ring according to claim 4, characterized in that two expanding insert means are arranged in each hollow ring segment.

6. An emergency running ring according to claim 5, characterized in that the spacer sleeve is connected with the expanding insert means by a second threaded connection.

7. An emergency running ring according to claim 5, characterized in that the expanding insert means is made in one piece with the associated spacer sleeve.

8. An emergency running ring according to claim 1, characterized in that the rim is an undivided rim for a motor vehicle wheel.

9. An emergency running ring according to claim 1, characterized in that outwardly angularly bent bracket means are provided at the ends of the expanding insert means supported at the hollow ring segments, said bracket means engaging in slots in the hollow ring segments.

10. An emergency running ring according to claim 1, characterized in that two expanding insert means are arranged in each hollow ring segment.

11. An emergency running ring according to claim 1, characterized in that the spacer sleeve is provided at its end facing the rim bed with a recess starting from the bore for the first clamping means, a seal means being provided in said recess.

12. An emergency running ring according to claim 3, characterized in that the rim is an undivided rim for a motor vehicle wheel.

* * * * *

UNITED STATES PATENT OFFICE
CERTIFICATE OF CORRECTION

Patent No. 3,638,701            Dated February 1, 1972

Inventor(s) Heinrich Roessler, Heinrich Baumann & Falk Zeidler

It is certified that error appears in the above-identified patent and that said Letters Patent are hereby corrected as shown below:

Column 1, line 3, which now reads:

"[72] Inventors: Heinrich George F. Rossler, Baden-Baden;"

should read as follows:

-- [72] Inventors: Heinrich G. F. Roessler, Baden-Baden;--

Signed and sealed this 22nd day of August 1972.

(SEAL)
Attest:

EDWARD M. FLETCHER, JR.
Attesting Officer

ROBERT GOTTSCHALK
Commissioner of Patents